United States Patent [19]

Elam

[11] Patent Number: 5,546,083

[45] Date of Patent: Aug. 13, 1996

[54] BIDIRECTIONAL REPEATER AMPLIFIER

[75] Inventor: Carl M. Elam, Dayton, Ohio

[73] Assignee: The United States of America as represented by the Secretary of the Air Force, Washington, D.C.

[21] Appl. No.: 285,176

[22] Filed: Jul. 14, 1981

[51] Int. Cl.⁶ .................................................. H04B 3/36
[52] U.S. Cl. ............................................................ 342/175
[58] Field of Search .......................... 179/170 R, 170 D, 179/170 NC, 170 HF, 170.2; 379/344, 345, 340; 342/15, 175

[56] References Cited

U.S. PATENT DOCUMENTS 3,689,711  9/1972  Earle et al. ........................ 379/340
3,855,431  12/1974  Stewart ............................. 379/344
3,911,372  10/1975  Seidel ............................... 379/345

*Primary Examiner*—Daniel T. Pihulic
*Attorney, Agent, or Firm*—Bernard E. Franz; Thomas L. Kundert

[57] ABSTRACT

A double diamond configuration of phase shift circuits are coupled via circulators, amplifiers, power dividers, and power combiners. The circuit arrangement serves to amplify signals in either direction while accurately maintaining relative phase shift. There is a 180 degree phase shift between components back to the originating transmission line, to this cancel them. The circuit may be used between microwave transmission lines, such as waveguides.

6 Claims, 1 Drawing Sheet

BIDIRECTIONAL REPEATER AMPLIFIER

RIGHTS OF THE GOVERNMENT

The invention described herein may be manufactured and used by or for the Government of-the United States for all governmental purposes without the payment of any royalty.

BACKGROUND OF THE INVENTION

This invention relates to repeater apparatus for amplifying two signals (at the same frequency) in opposite directions, and more particularly, to apparatus for amplifying such signals at microwave frequencies.

In many systems it is a requirement that electrical signals be transmitted in both directions between two locations. The straightforward manner of doing this is to use two separate transmission lines. However, frequently, for economy or other reasons, a single transmission line is used, with the signals transmitted in the two directions at the same time. This usually presents no significant problem, unless amplification is required. In telephony and other arts over the years many arrangements have been used to provide two-way amplification. These systems may include various types of hybrid circuits, fast switching to select the direction of amplification, selective attenuation, negative impedance devices, etc. Problems encountered include singing (oscillation around a loop), imperfect impedance balance at hybrids, echoes, delay distortion effects, phase error, etc.

The state of the art is indicated for example by U.S. Pat. No. 3,689,711 by Earle et al for a Call Diverter Repeater; U.S. Pat. No. 3,855,431 by Stewart for an Electronic Hybrid Amplifier; and U.S. Pat. No. 3,911,372 by Seidel for an Amplifier With Input and Output Impedance Match.

In microwave systems, such as at radar frequencies of one to fifteen gigahertz, it may be particularly important to preserve the phase relation. One prior solution to the two-way amplification problem has been to switch an amplifier to be instantaneously operative in the direction of the signal. This is in effect a time division approach. However, available switches are high speed or high power, but not both.

SUMMARY OF THE INVENTION

An object of the invention is to provide two-way amplification with reduction of the relative phase error between the two signals. Another object is to provide a circuit which passes the signals with a minimum delay. Still another object is to eliminate the need for high-power fast-acting switches.

According to the invention, a repeater amplifier arrangement between two two-way transmission lines comprises a double diamond configuration of phase shift circuits, coupled via circulators, amplifiers, power dividers, and power combiners. The circuit arrangement serves as a bidirectional repeater amplifier which accurately maintains the relative phase of the two signals (of the same frequency) passing through it in opposite directions.

Features include the following:

1. Minimum relative phase shift between the two signals.
2. Capability to simultaneously handle two signals.
3. Minimum signal delay through the circuit (special delay lines not required).
4. Switches are not required to route the signals.

DETAILED DESCRIPTION

Figure 1:
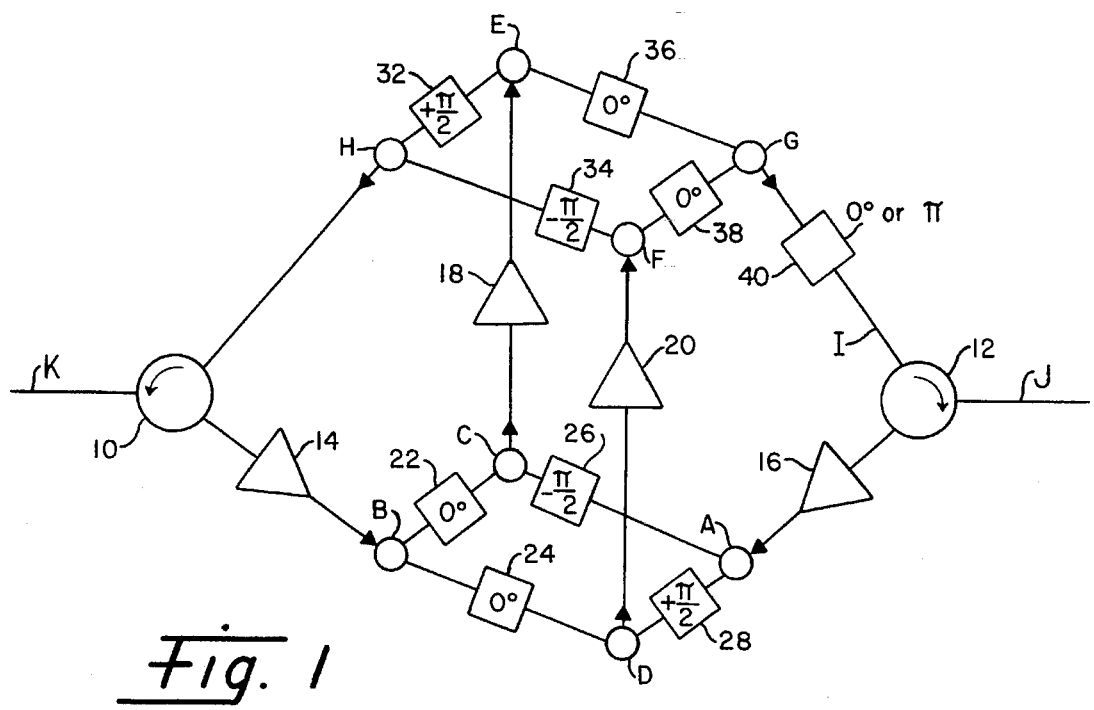
FIGS. 1 and 2 are functional block diagrams of embodiments of the invention.

The invention is a circuit which is comprised of several amplifiers, phase shifters, power dividers, power combiners, and circulators in a hybrid/bridge arrangement. The circuit arrangement serves as a bidirectional repeater amplifier which accurately maintains the relative phase of the two signals (of the same frequency) passing through it in opposite directions.

The external lines J and K, as well as the lines interconnecting the components, may be waveguides or other microwave transmission devices; in which case the other elements are also microwave devices adapted to interface with the lines.

Circulator 10 routes the left input signal on line K to the input of preamplifier 14, routes the output from power combiner H to the left port to line K, and provides signal isolation from power combiner H to preamplifier 14. Similarly, circulator 12 routes signals from line J to preamplifier 16, from line I to line J, and provides isolation from line I to preamplifier 16.

Amplifiers 14 and 16 will normally be low power preamplifiers which provide the desired system sensitivity and noise figure. Amplifiers 18 and 20 will normally be identical power amplifiers.

Power dividers A, B, E and F serve to equally divide a single signal into two signals. Power combiners C, D, G and H combine signals from two sources into a single output signal.

The phase shifters 22, 24, 26 and 28 in a first diamond or bridge configuration, and phase shifters 32, 34, 36 and 38 in a second diamond, are used to introduce precise phase changes in the signals passing through them.

The power dividers and combiners A–G may be considered to be nodes of the two diamonds. Node A splits the signals from preamplifier 16 for input to phase shifters 26 and 28. Node B splits the signals from preamplifier 14 for input to phase shifters 22 and 24. Node C combines the signals from phase shifters 22 and 26 for input to amplifier 18. Node D combines the signals from phase shifters 24 and 28 for input to amplifier 20.

Node E splits the signals from amplifier 18 for input to phase shifters 32 and 36. Node F splits the signals from amplifier 20 for input to phase shifters 34 and 38. Node G combines the signals from phase shifters 36 and 38 for input to an additional phase shifter 40. Node H combines the signals from phase shifters 32 and 34 for input to the circulator 10. The phase shifter 40, connected between node G and circulator 12, provides a phase shift of zero degrees or pi (180°). This permits control of the relative phase of the two signals. The device 40 could be continuously variable.

In the embodiment shown in FIG. 1, the devices 22, 24, 36 and 38 each have a phase shift of zero degrees; the devices 26 and 34 have a phase shift of minus one half pi (90°), and devices 28 and 32 have a phase shift of plus one half pi (+90°).

Circuit connections: The circuit is constructed so that the following signal paths are equal BC=BD, AC=AD, CE=DF, EH=FH and EG=FG.

Circuit Operation

Signals enter the circuit from lines K and J, and are routed by the circulators into preamplifiers 14 and 16 respectively.

The outputs of preamplifiers 14 and 16 are divided and phase shifted (by the quantities given in the diagram). The phase shifted signals are recombined at circuit junctions C and D and are sent to power amplifiers 18 and 20 respectively. The outputs of amplifiers 18 and 20 are divided into two equal signals which are routed into the upper phase shifters.

After being phase shifted the signals are recombined at circuit junctions G and H. If the shifts are accurate, the signal at node H will be the same signal as entered at line J except it will be amplified. Likewise, the signal at node G will be the same as entered at line K with amplification. In addition, the circuit will prevent signals from returning back in the direction of their origin. This is accomplished since the values of the phase shifters cause a 180 degree phase shift in the two signal components which are returning back to their source, be it either K or J.

It is not necessary for both input signals on lines K and J to be present simultaneously for this amplifier circuit to amplify and route signals.

Alternative Embodiment

Several variations are possible for the phase shifter quantities shown in FIG. 1. In a first alternative, phase shifters 22, 24, 28, 32, 36 and 38 each provide a phase shift of zero (0°), while phase shifters 26 and 34 each provide a phase shift of pi (180°). In a second alternative, phase shifters 22, 24, 28, 34, 36 and 38 each provide a phase shift of zero (0°), while phase shifters 26 and 32 each provide a phase shift of pi (180°).

These circuits perform in the same manner as the circuit in FIG. 1 in that the phase shifters cause the signals to flow from line K to J with amplification and from line J to K with amplification and at the same time prevent signals from returning back in the direction of their source.

Figure 2:
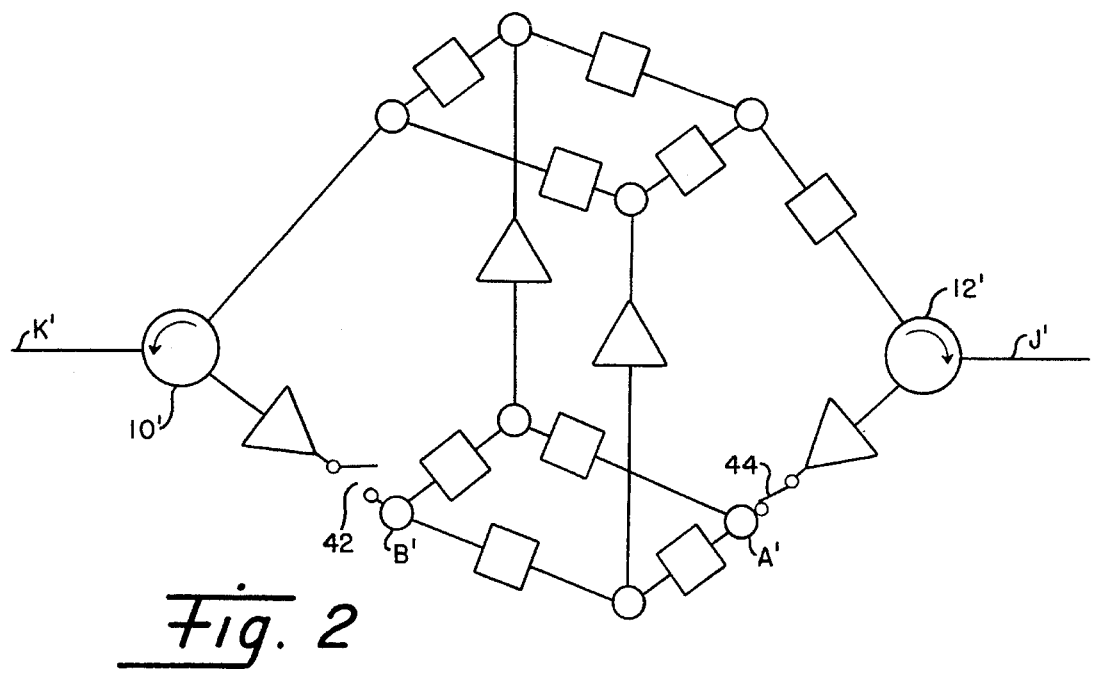

In another embodiment shown in FIG. 2, low-power, high-speed electronic switches are used with the preamplifiers. One switch 42 is located somewhere between circulator 10' and node B', and another switch 44 is located somewhere between circulator 12' and node A'. The switch control circuit (not shown) senses the signals to cause one switch to be open and the other closed, changing according to the instantaneous direction of signal flow. These switches are installed to prevent the simultaneous flow of signals through the system.

It is also possible to replace the circulators 10 and 12 by high power switches. At any moment, one of the switches would couple line J or K to a preamplifier, while the other couples the output from node H or G to the other line K or J.

For optimum operation of the circuit of FIG. 1, a large emphasis should be put on phase matching of components. The reflection coefficients of the combiners and splitters need to be extremely low. The amplifiers 18 and 20 should maintain phase linearity over the range from zero input to an input equal to a preamplifier output.

Thus, while preferred constructional features of the invention are embodied in the structure illustrated herein, it is to be understood that changes and variations may be made by the skilled in the art without departing from the spirit and scope of my invention.

I claim:

1. A bidirectional amplifier arrangement between first and second two-way transmission lines, said arrangement comprising:

first and second diamond configurations, each having four phase shift devices and four nodes, with each phase shift device connected between two nodes to form a ring, each diamond configuration having two power dividers at opposite nodes each to receive signal power at an input port and devide it equally to two of the phase shift devices, and two power combiners at the other two nodes each to receive signal power from two of the phase shift devices and sum it to an output port;

first and second coupling means connected respectively to said first and second transmission lines, each coupling means having an input port, an output port, and a two-way port, each operative to couple signal power from the two-way port to the output port, from the input port to the two-way port, and to provide isolation from the input port to the output port, each connected to its transmission line at its two-way port;

a first preamplifier coupled between the output port of the first coupling means and one power divider of the first diamond configuration, a second preamplifier coupled between the output port of the second coupling means and the other power divider of the first diamond configuration;

first and second power amplifiers, each coupled between the output port of one power combiner of the first diamond configuration and the input port of one power divider of the second diamond configuration;

the output ports of the two power combiners of the second diamond configuration being coupled respectively to the input ports of said first and second coupling means; and the phase shift provided by each of the phase shift devices being precisely determined so that a signal entering one of said coupling means from one transmission line is transmitted via the other coupling means to the other transmission line unchanged except for amplification, and signals are prevented from returning back to the transmission line from which they originate because of a 180 degree phase shift between the signal components.

2. The arrangement as set forth in claim 1, wherein in the first diamond configuration the phase shift from the first preamplifier to each of the first and second power amplifiers is zero degrees, from the second preamplifier to the first power amplifier is minus ninety degrees, and from the second preamplifier to the second power amplifier is plus ninety degrees;

and in the second diamond configuration the phase shift from the first power amplifier to the first coupling means is plus ninety degrees, from the second power amplifier to the first coupling means is minus ninety degrees, and is zero degrees from each power amplifier to the output port of the power divider coupled to the second coupling means.

3. The arrangement as set forth in claim 1, wherein in the first diamond configuration there is a 180 degree phase shift in the phase shift device from the second preamplifier to one of the power amplifiers, and a zero degree phase shift in the other three phase shift devices;

and in the second diamond configuration there is a 180 degree phase shift in the phase shift device from one of the power amplifiers to the output port of the power combiner coupled to the first coupling means, and a zero phase shift in the other three shift devices.

4. The arrangement as set forth in any of claims 1, 2 or 3, wherein said first and second coupling means are microwave circulators.

5. The arrangement as set forth in claim 4, further including a phase shift device coupled between the second diamond configuration and the input port of the second circulator, providing a phase shift of an integer multiple of 180 degrees, wherein said integer multiple may be zero.

6. A bidirectional amplifier arrangement between first and second two-way transmission lines, said arrangement comprising:

first and second diamond configurations, each having four phase shift devices in a ring with nodes between them;

means coupling signal power from the first and second transmission lines to opposite nodes of the first diamond configuration;

means coupling the other two nodes of the first diamond configuration to opposite nodes of the second diamond configuration;

means coupling the other two nodes of the second diamond configuration to the first and second transmission lines, respectively with amplifying means included in said coupling; and the phase shift provided by each of the phase shift devices being precisely determined so that a signal from either transmission line is transmitted to the other transmission line with amplification, and signals are prevented from returning back to the transmission line from which they originate because of a 180 degree phase shift between the signal components.

* * * * *